July 28, 1964     W. M. FELTS     3,142,397
CABLE OPERATED VEHICLE LOADER
Filed June 13, 1962     3 Sheets-Sheet 1

WALLACE M. FELTS
INVENTOR

BY *Herbert J. Brown*

ATTORNEY

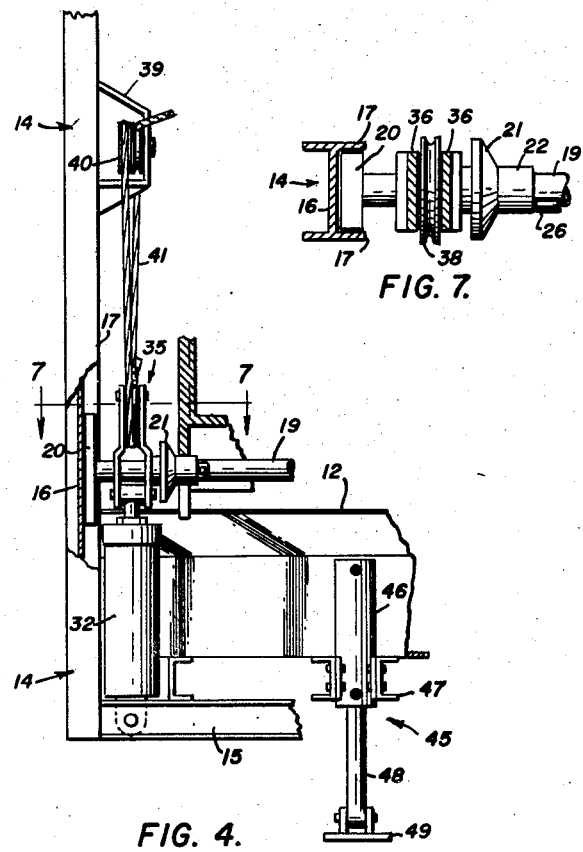
FIG. 4.
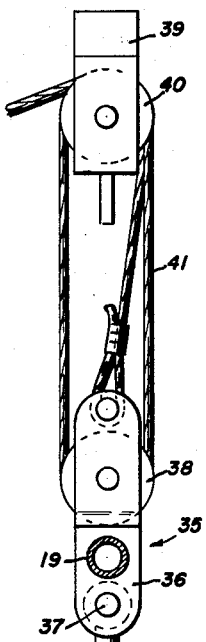
FIG. 7.
FIG. 6.
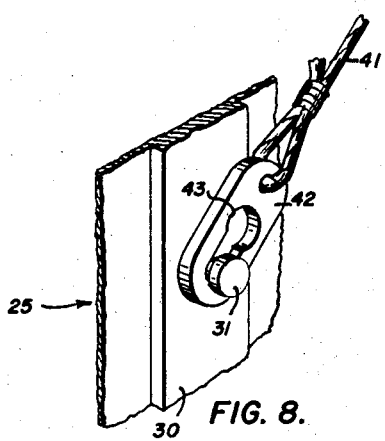
FIG. 8.
WALLACE M. FELTS
INVENTOR

WALLACE M. FELTS
INVENTOR.

BY *Herbert J. Brown*
ATTORNEY

United States Patent Office 3,142,397
Patented July 28, 1964

3,142,397
CABLE OPERATED VEHICLE LOADER
Wallace M. Felts, Fort Worth, Tex., assignor to Fruehauf Trailer Company, Detroit, Mich., a corporation of Michigan
Filed June 13, 1962, Ser. No. 202,223
1 Claim. (Cl. 214—302)

This invention relates to loading mechanisms for vehicle bodies and has reference to means for lifting and tilting portable containers. Particularly, the invention is for use with garbage trucks and trailers wherein packer blades are hydraulically operated along the length of the vehicle bodies for compacting refuse and, in some constructions, for dumping the same.

An object of the invention is to provide improved means for quickly and conveniently connecting a portable container to the lifting mechanism of a side loading vehicle body.

A particular object is to provide combined hydraulic and mechanical means locking the container to the vehicle while the container is being raised and tilted.

Another object is to provide means whereby containers of various sizes and heights may be readily connected with the lift mechanism for tilting and dumping the contents of the containers.

Another particular object is to provide centering means whereby the container may be quickly and accurately aligned on the hydraulically actuated hinge bar.

These and other objects will become apparent from the following description and the accompanying drawings, wherein:

FIGURE 4 is an enlarged fragmentary sectional and elevational view of the left portion of the tilt apparatus shown in FIGURE 1.

FIGURE 6 is a vertical sectional view of one of the hydraulic lift cylinders and showing the mechanical tilting apparatus connected therewith.

FIGURE 7 is a sectional view taken on line 7–7 of FIGURE 4.

FIGURE 8 is a fragmentary perspective view of one side of the container and a detachable latch connected therewith.

Figure 1:
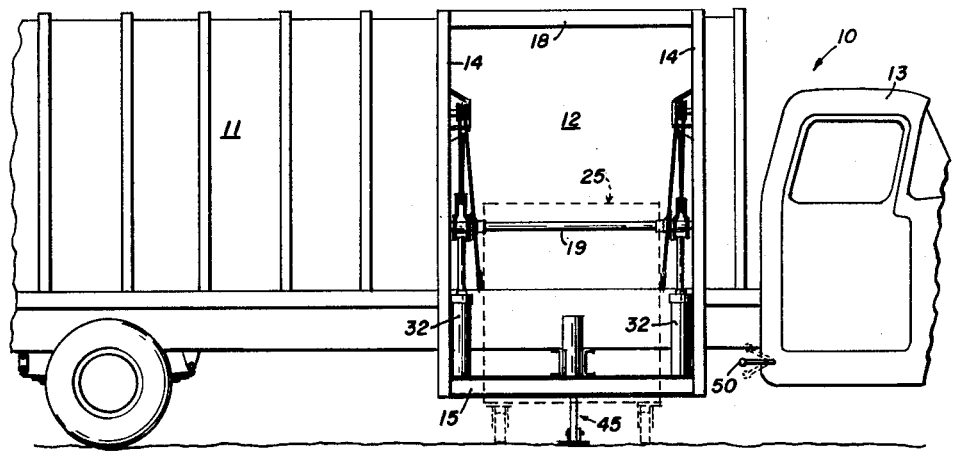
FIGURE 1 is a fragmentary side elevational view of a garbage truck showing a preferred form of the invention and illustrating a portable container, by means of dotted lines, in position to be lifted and tilted.
Figure 5:
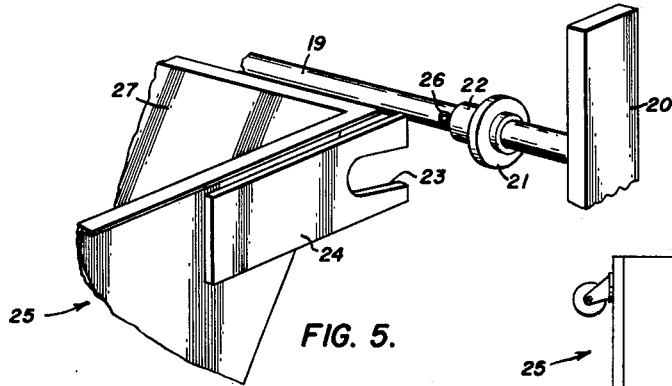
FIGURE 5 is a fragmentary perspective view of one end of the horizontal hinge bar and showing the relation of one of two centering cones with reference to a hinge plate on a corresponding corner of the container.

The vehicle 10 illustrated in FIGURE 1 is a typical garbage truck having a ribbed box like body 11 including a loading opening 12 on one or both sides near the truck cab 13. If two loading openings 12 are provided, it is to be understood that the herein described tilt mechanism may be applied to each opening. Vertical tracks 14 are secured along sides of the opening 12 and extend below the side of the body where the lower ends of the tracks are joined by a cross member 15. As shown in the drawings, the tracks 14 are of I beam stock but may be of channel stock or other cross section configuration so long as the same includes a webb 16 and inwardly directed flanges 17 along the longitudinal edges thereof. The upper ends of the tracks 14 are joined by an upper cross member 18.

A round horizontal hinge bar 19 has shoes 20 on the ends thereof for sliding engagement in the tracks 14. Inwardly of the ends of the hinge bar 19 there are freely rotatable conical rollers 21 having cylindrical extensions 22 at their smaller ends for engagement with slots 23 in extending ends of hinge plates 24 on opposite sides of portable containers 25. Inward displacement of the conical rollers 21 is prevented by stops 26 on the hinge bar 19.

Each container 25 is rectangular as viewed from above, but has a downwardly and inwardly directed end surface 27 at the end including the hinge plates 24. Wheels 28 and casters 29 are provided on the bottom of the containers 25, and vertical reinforcing members 30 are secured to the sides for supporting outwardly projecting headed lift pins 31.

Mounted on and near each end of the lower cross member 15 and parallel with the tracks 14 there are upwardly projecting hydraulic cylinders 32 having pistons 33 therein, upwardly projecting piston rods 34, and traveling pulley blocks 35 on the extending ends of the piston rods. Each traveling pulley block 35 is comprised of a pair of spaced elongate vertical side plates 36, the lower ends of which are connected with a cross rod 37 on the extending end of the piston rod 34 therebeneath. A pulley 38 is mounted between the upper portions of each pair of side plates 36 and the hinge bar 19 extends through the plates between the cross rods 37 and the pulleys.

Above each cylinder 32 and mounted on the vertical tracks 14 there are brackets 38 supporting upper pulleys 40. A cable 41 is connected with the upper end of each traveling block 35 and extends around pulleys 40 and 38, the free end of the cable being provided with a latch 42 for connection with the lift pins 31 on the sides of the containers 25. The latches 42 shown are elongate flat bars having bayonet slots 43 for receiving the pin 31, but other latches may be used, for example, hooks, not shown.

A landing gear unit 45 may be provided for each described tilting assembly and each landing gear unit is comprised of a vertically disposed hydraulic cylinder 46 mounted between transverse channels 47 secured beneath the body 11, a downwardly extending piston rod 48 and a hinged foot on the lower end thereof. Although the landing gear cylinder 45 may be operated independently of the first described hydraulic cylinders 32 preferably the cylinders work in unison from the same power source. The hydraulic system operating handle 50 is located at a convenient place, for example, at the rear of the cab 13.

Figures 2, 3:
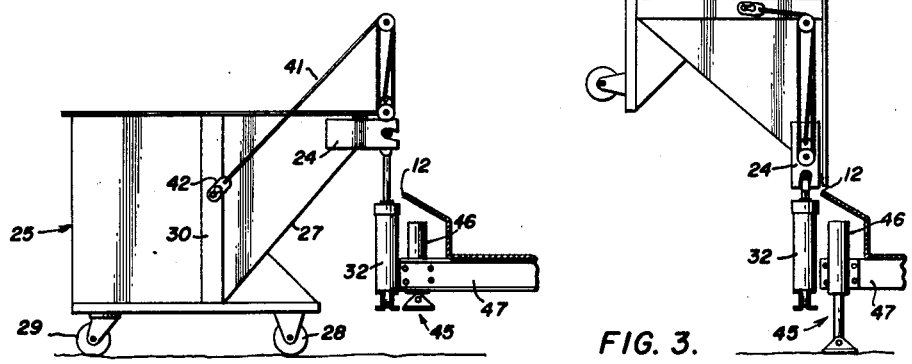
FIGURE 2 is a fragmentary sectional and elevational view of the truck body and the container and shown at a right angle relative to FIGURE 1.
FIGURE 3 is a view similar to FIGURE 2, but showing the container in its titled position.

The operation of the first described form of the invention is as follows. A loaded container 25 is wheeled to a position where the hinge plates 24 thereon are opposite the hinge bar 19, and the latter is then vertically adjusted so that the slots 23 may be caused to engage the cylindrical extension 22 of the conical rollers 21. The conical surfaces of the rollers 21 guide the hinge plates 24 into place for quickly effecting the engagement of the cylindrical surfaces 22 with the slots 23. The latches 42 on the cables 41 are then connected with the lift pins 31, after which the pistons 33 are caused to move downwardly, with the result that the container 25 is tilted to a vertical position as shown in FIGURE 3 for emptying the container contents into the body 11. The operation is reversed to lower the container 25 and disconnect the cables 41.

Figure 9:
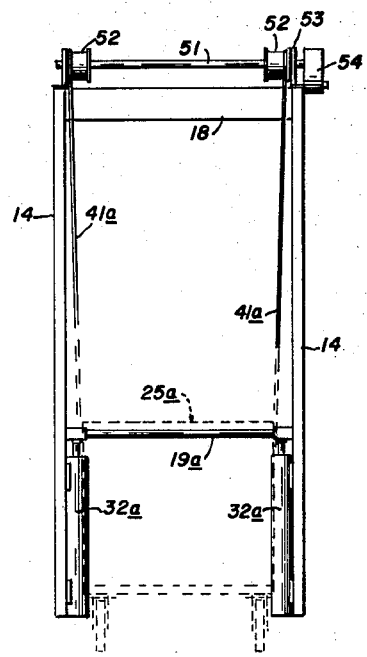
FIGURE 9 is an elevational view similar to FIGURE 1 showing a modified form of the invention.
Figure 11:
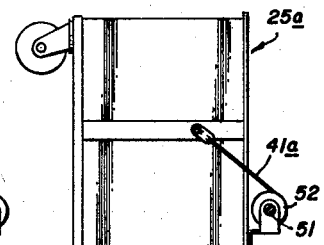
FIGURES 10 and 11 are side elevational views of the container in its horizontal and tilted positions as operated by the form of the invention illustrated in FIGURE 9.
Figure 10:
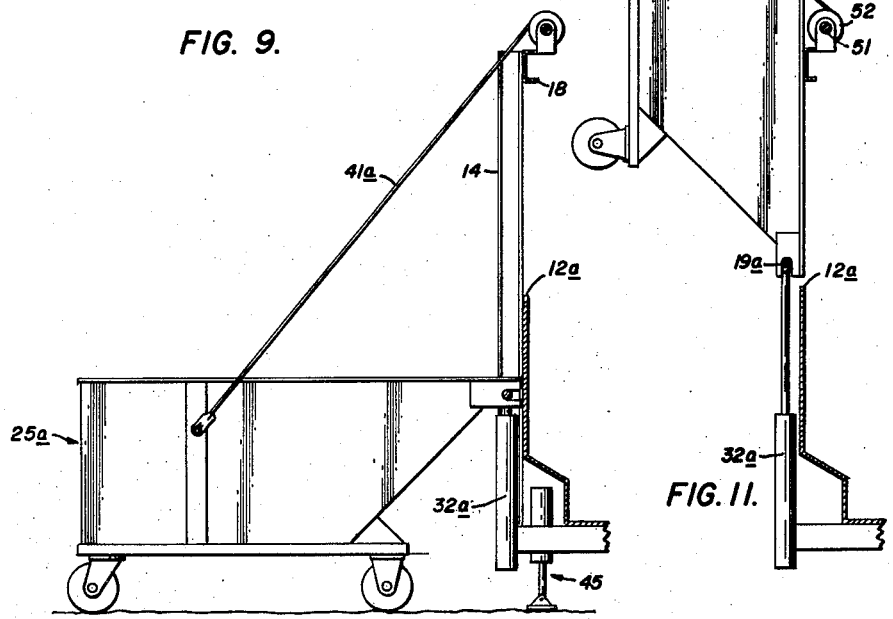

The modified form of the invention illustrated in FIGURES 9–11 is for handling larger sizes of containers 25a.

In this form of the invention the traveling block 35 and attendant parts are eliminated and in their place there is provided a horizontal shaft 51 near the horizontal cross member 18, and which shaft has drums 52 thereon just inwardly of bearing supports 53 mounted on the upper ends of the tracks 14. A hydraulic motor 54 is operatively connected with one end of the shaft 51, and the cables 41a are wound on the drums 52. The position of the cylinders 32a is reversed with reference to the first described cylinders 32 with the result that the hinge bar 19a is raised instead of lowered and whereby the contents of the container may be emptied over a higher lower edge of the opening 12a. The second form of the invention includes the previously described conical rollers 21, vertical tracks 14, guide shoes 20, hinge plates 24 on the containers 25a and other corresponding parts which carry the same reference numerals.

The invention is not limited to the exemplary constructions herein shown and described, but may be made in various ways within the scope of the appended claim.

What is claimed is:

Apparatus for emptying a container into a vehicle body, comprising:

vertical parallel spaced tracks on a side of said body, a horizontal hinge bar, the ends of which are movably received by said tracks, means raising and lowering said hinge bar, pulley means above said hinge bar and higher than the top of said container, means carried by said container detachably and hingedly engaging said hinge bar, and cable means connected with said hinge bar, positioned over said pulley means and connected with said container at a location spaced from said hinge bar.

References Cited in the file of this patent

UNITED STATES PATENTS

| | | |
|---|---|---|
| 1,362,560 | Coe | Dec. 14, 1920 |
| 2,877,910 | Nelson | Mar. 17, 1959 |
| 2,886,196 | Mills | May 12, 1959 |
| 2,928,562 | Gollnick | Mar. 15, 1960 |
| 3,024,928 | Freany | Mar. 13, 1962 |

FOREIGN PATENTS

| | | |
|---|---|---|
| 531,400 | Great Britain | Jan. 3, 1941 |